United States Patent
Matas et al.

(10) Patent No.: US 10,628,030 B2
(45) Date of Patent: *Apr. 21, 2020

(54) METHODS AND SYSTEMS FOR PROVIDING USER FEEDBACK USING AN EMOTION SCALE

(71) Applicant: Facebook, Inc., Menlo Park, CA (US)

(72) Inventors: Michael James Matas, Healdsburg, CA (US); Benjamin S. Langholz, San Francisco, CA (US); Brian Daniel Amerige, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/056,350

(22) Filed: Aug. 6, 2018

(65) Prior Publication Data

US 2018/0341401 A1 Nov. 29, 2018

Related U.S. Application Data

(63) Continuation of application No. 14/728,847, filed on Jun. 2, 2015, now Pat. No. 10,042,548.

(51) Int. Cl.
*G06F 3/0488* (2013.01)
*G06T 11/60* (2006.01)
(Continued)

(52) U.S. Cl.
CPC ......... *G06F 3/04883* (2013.01); *G06Q 30/02* (2013.01); *G06Q 50/01* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 6,340,330 B1 * | 1/2002 | Oishi | A63F 13/10 463/8 |
| 7,478,129 B1 * | 1/2009 | Chemtob | H04L 12/1827 709/204 |

(Continued)

OTHER PUBLICATIONS

Matas, Office Action, U.S. Appl. No. 14/728,847, dated Aug. 15, 2017, 18 pgs.

(Continued)

*Primary Examiner* — Tuan S Nguyen
(74) *Attorney, Agent, or Firm* — Morgan, Lewis & Bockius LLP

(57) ABSTRACT

A client device having a touch-sensitive display displays (i) multiple affordances in a first area of the touch-sensitive display and (ii) a content item in a second area of the touch-sensitive display. The affordances include a user-feedback affordance for providing feedback about the content item. The device detects a first user input at the user-feedback affordance. In response, the device displays a first facial expression superimposed on the content item. Concurrently, the device replaces display of the affordances with a range of facial expressions, each facial expression in the range corresponding to a respective opinion of a range of opinions. The device detects a second user input at a location of a second facial expression in the displayed range of facial expressions. The second facial expression is different from the first facial expression. In response, the device displays the second facial expression superimposed on the content item.

20 Claims, 10 Drawing Sheets

(51) Int. Cl.
*G06Q 30/02* (2012.01)
*G06Q 50/00* (2012.01)

(56) References Cited

U.S. PATENT DOCUMENTS

| | | | |
|---|---|---|---|
| 2009/0293079 A1* | 11/2009 | McKee | G06Q 10/105 |
| | | | 725/10 |
| 2010/0123724 A1 | 5/2010 | Moore et al. | |
| 2014/0324885 A1 | 10/2014 | McKenzie | |
| 2015/0248235 A1 | 9/2015 | Offenberg et al. | |
| 2016/0085773 A1 | 3/2016 | Chang et al. | |

OTHER PUBLICATIONS

Matas, Final Office Action, U.S. Appl. No. 14/728,847, dated Feb. 1, 2018, 19 pgs.
Matas, Notice of Allowance, U.S. Appl. No. 14/728,847, dated Jun. 8, 2018, 16 pgs.

* cited by examiner

METHODS AND SYSTEMS FOR PROVIDING USER FEEDBACK USING AN EMOTION SCALE

CROSS REFERENCE TO RELATED APPLICATIONS

This application is a continuation of U.S. patent application Ser. No. 14/728,847, filed Jun. 2, 2015, entitled "Methods and Systems for Providing User Feedback Using an Emotion Scale," which is incorporated by reference herein in its entirety.

TECHNICAL FIELD

This relates generally to providing user feedback, including but not limited to selecting an emotion indicator in a displayed range of emotion indicators.

BACKGROUND

The Internet has become an increasingly dominant platform for the publication of electronic content, for both the media and the general population. At the same time, enabling users to interact with such published electronic content has become an increasingly important feature for online services, such as social networks, to implement.

Typical forms of user feedback, however, are often of a binary nature (e.g., user approves or disapproves), and therefore do not accurately and precisely convey user opinions with respect to the content for which the user feedback is provided.

SUMMARY

Accordingly, there is a need for methods, systems, and interfaces for displaying and providing nuanced user feedback in a simple, accurate, and efficient manner. Providing a range of emotion indicators along a scale allows a user easily to use touch gestures to select a emotion indicator that accurately captures the user's opinion of a content item, thereby generating user feedback for the content item. Such methods and interfaces optionally complement or replace conventional methods for providing user feedback.

In accordance with some embodiments, a method is performed at a client device with one or more processors and memory storing instructions for execution by the one or more processors. The method includes displaying a content item and displaying a first facial expression superimposed on the content item. Concurrently with and separately from displaying the first facial expression, a range of emotion indicators is displayed, each emotion indicator of the range of emotion indicators corresponding to a respective opinion of a range of opinions. A first user input is detected at a display location corresponding to a respective emotion indicator of the range of emotion indicators. In response to detecting the first user input, the first facial expression is updated to match the respective emotion indicator.

In accordance with some embodiments, a client device includes one or more processors, memory, and one or more programs; the one or more programs are stored in the memory and configured to be executed by the one or more processors. The one or more programs include instructions for performing the operations of the method described above. In accordance with some embodiments, a non-transitory computer-readable storage medium has stored therein instructions that, when executed by an electronic device such as the client device, cause the electronic device to perform the operations of the method described above.

Thus, client devices are provided with more effective and efficient methods for providing user feedback, thereby increasing the effectiveness and efficiency of such devices and user satisfaction with such devices.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first user input could be termed a second user input, and, similarly, a second user input could be termed a first user input, without departing from the scope of the various described embodiments. The first user input and the second user input are both user inputs, but they are not the same user input.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
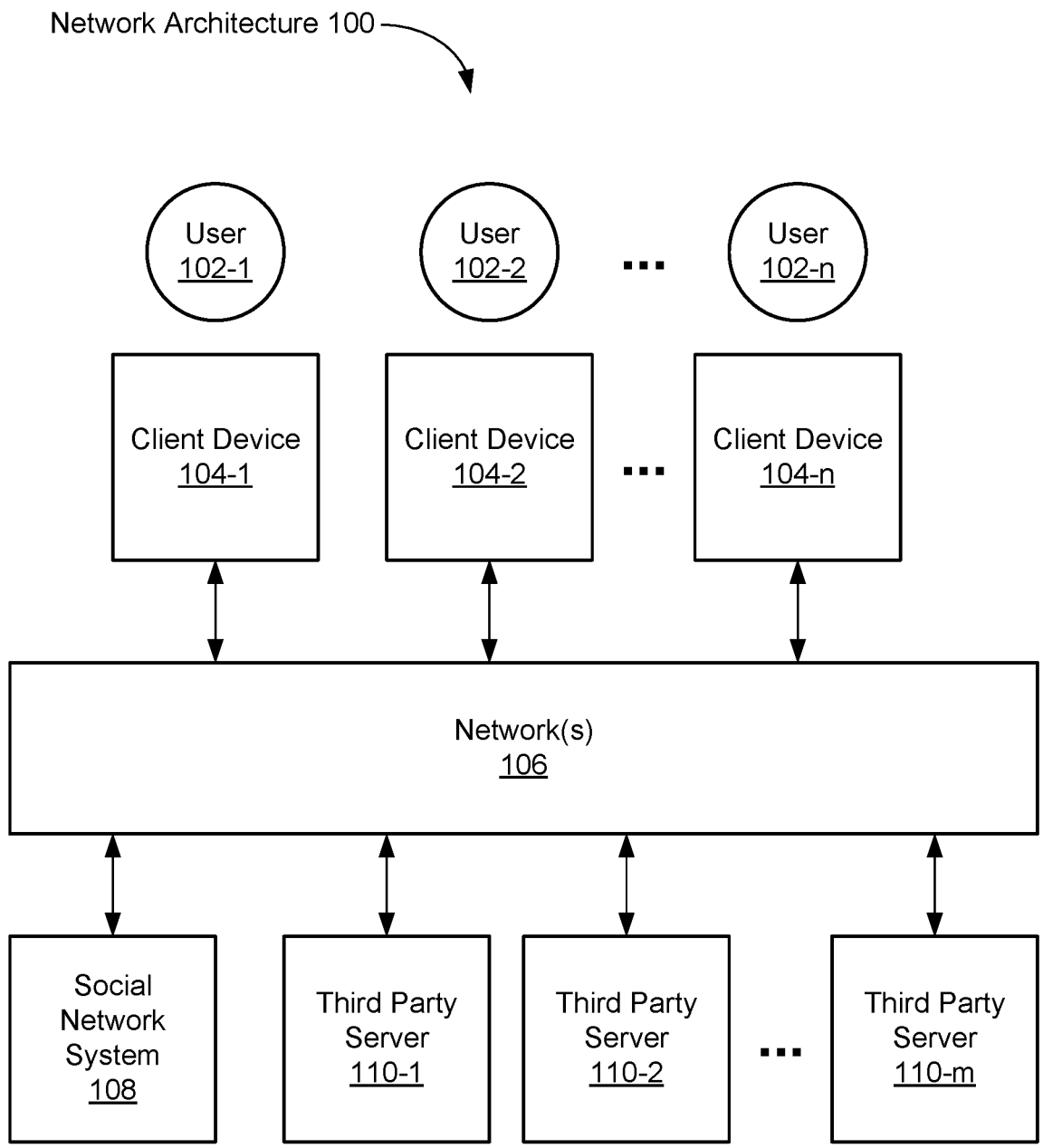
FIG. 1 is a block diagram illustrating an exemplary network architecture of a social network in accordance with some embodiments.

FIG. 1 is a block diagram illustrating an exemplary network architecture 100 of a social network in accordance with some embodiments. The network architecture 100 includes a number of client devices (also called "client systems," "client computers," or "clients") 104-1, 104-2, . . . 104-n communicably connected to an electronic social-network system 108 by one or more networks 106 (e.g., the Internet, cellular telephone networks, mobile data networks, other wide area networks, local area networks, metropolitan area networks, and so on). In some embodiments, the one or more networks 106 include a public communication network (e.g., the Internet and/or a cellular data network), a private communications network (e.g., a private LAN or leased lines), or a combination of such communication networks.

In some embodiments, the client devices 104-1, 104-2, . . . 104-n are computing devices such as smart watches, personal digital assistants, portable media players, smart phones, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), and/or other appropriate computing devices that can be used to communicate with the social-network system 108. In some embodiments, the social-network system 108 is a single computing device such as a computer server, while in some embodiments, the social-network system 108 is implemented by multiple computing devices working together to perform the actions of a server system (e.g., cloud computing).

Users 102-1, 102-2, . . . 102-n employ the client devices 104-1, 104-2, . . . 104-n to access the social-network system 108 and to participate in a corresponding social-networking service provided by the social-network system 108. For example, one or more of the client devices 104-1, 104-2, . . . 104-n execute web browser applications that can be used to access the social-networking service. As another example, one or more of the client devices 104-1, 104-2, . . . 104-n execute software applications that are specific to the social-networking service (e.g., social-networking "apps" running on smart phones or tablets, such as a Facebook social-networking application running on an iPhone, Android, or Windows smart phone or tablet).

Users interacting with the client devices 104-1, 104-2, . . . 104-n can participate in the social-networking service provided by the social-network system 108 by posting information, such as text comments (e.g., updates, announcements, replies), digital photos, videos, audio files, links, and/or other electronic content. Users of the social-networking service can also annotate information posted by other users of the social-networking service (e.g., endorsing or "liking" a posting of another user, commenting on a posting by another user, or providing other feedback such as a facial expression on a posting by another user). In some embodiments, information can be posted on a user's behalf by systems and/or services external to the social-network system 108. For example, the user may post a review of a movie to a movie-review website, and with proper permissions that website may cross-post the review to the social network system 108 on the user's behalf. In another example, a software application executing on a mobile client device, with proper permissions, may use global positioning system (GPS) or other geo-location capabilities (e.g., Wi-Fi or hybrid positioning systems) to determine the user's location and update the social network system 108 with the user's location (e.g., "At Home", "At Work", or "In San Francisco, Calif."), and/or update the social network system 108 with information derived from and/or based on the user's location. Users interacting with the client devices 104-1, 104-2, . . . 104-n can also use the social-networking service provided by the social-network system 108 to define groups of users. Users interacting with the client devices 104-1, 104-2, . . . 104-n can also use the social-networking service provided by the social-network system 108 to communicate and collaborate with each other.

In some embodiments, the network architecture 100 also includes third-party servers 110-1, 110-2, . . . 110-m. In some embodiments, a given third-party server 110 is used to host third-party websites that provide web pages to client devices 104, either directly or in conjunction with the social-network system 108. In some embodiments, the social-network system 108 uses inline frames ("iframes") to nest independent websites within a user's social network session. In some embodiments, a given third-party server is used to host third-party applications that are used by client devices 104, either directly or in conjunction with the social-network system 108. In some embodiments, the social-network system 108 uses iframes to enable third-party developers to create applications that are hosted separately by a third-party server 110, but operate within a social-networking session of a user 102 and are accessed through the user's profile in the social-network system 108. Exemplary third-party applications include applications for books, business, communication, contests, education, entertainment, fashion, finance, food and drink, games, health and fitness, lifestyle, local information, movies, television, music and audio, news, photos, video, productivity, reference material, security, shopping, sports, travel, utilities, and the like. In some embodiments, a given third-party server 110 is used to host enterprise systems, which are used by client devices 104, either directly or in conjunction with the social-network system 108. In some embodiments, a given third-party server 110 is used to provide third-party content (e.g., news articles, reviews, message feeds, etc.).

In some embodiments, a given third-party server 110 is a single computing device, while in other embodiments, a given third-party server 110 is implemented by multiple computing devices working together to perform the actions of a server system (e.g., cloud computing).

Figure 2:
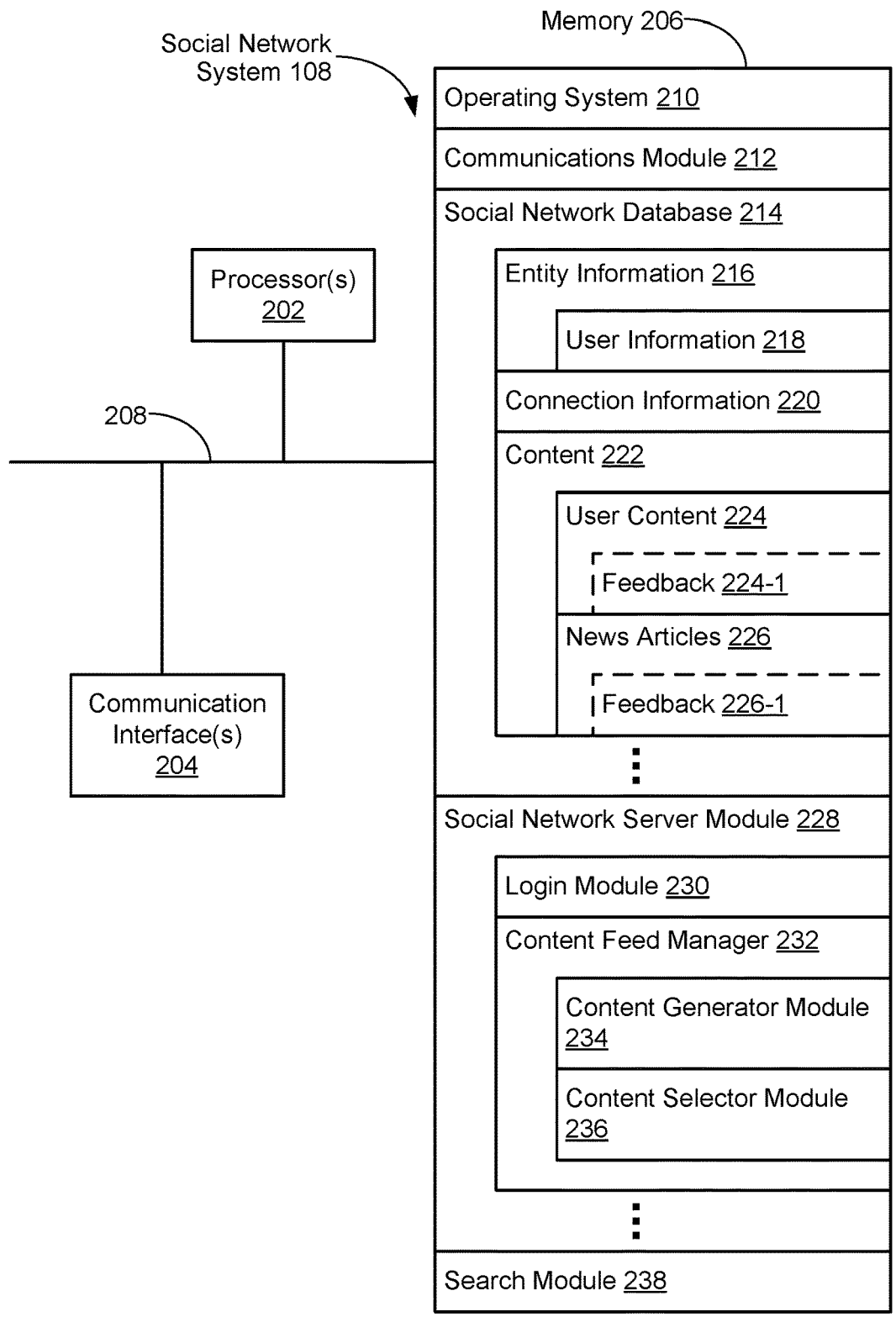
FIG. 2 is a block diagram illustrating an exemplary social-network system in accordance with some embodiments.

FIG. 2 is a block diagram illustrating an exemplary social-network system 108 in accordance with some embodiments. The social-network system 108 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The social-network system 108 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 206 may optionally include one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules and data structures, or a subset or superset thereof:
- an operating system 210 that includes procedures for handling various basic system services and for performing hardware dependent tasks;
- a network communication module 212 that is used for connecting the social-network system 108 to other computers via the one or more communication network interfaces 204 (wired or wireless) and one or more communication networks (e.g., the one or more networks 106);
- a social network database 214 for storing data associated with the social network, such as:
  - entity information 216, such as user information 218;
  - connection information 220; and
  - content 222, such as:
    - user content 224, which includes user feedback 224-1 (e.g., corresponding opinions of selected emotion indicators, which may include numerical index values); and/or
    - news articles 226, which include user feedback 226-1, (e.g., corresponding opinions of selected emotion indicators, which may include numerical index values);
- a social network server module 228 for providing social-networking services and related features (e.g., in conjunction with browser module 338 or social network client module 340 on the client device 104, FIG. 3), which includes:
  - a login module 230 for logging a user 102 at a client 104 into the social-network system 108; and
  - a content feed manager 232 for providing content to be sent to clients 104 for display, which includes:
    - a content generator module 234 for adding objects to the social network database 214, such as images, videos, audio files, comments, status messages, links, applications, and/or other entity information 216, connection information 220, or content 222; and
    - a content selector module 236 for choosing the information/content to be sent to clients 104 for display; and
- a search module 238 for enabling users of the social-network system to search for content and other users in the social network.

The social network database 214 stores data associated with the social network in one or more types of databases, such as graph, dimensional, flat, hierarchical, network, object-oriented, relational, and/or XML databases.

In some embodiments, the social network database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social-networking service. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, login information, privacy and other preferences, biographical data, and the like. In some embodiments, for a given user, the user information 218 includes the user's name, profile picture, contact information, birth date, sex, marital status, family status, employment, education background, preferences, interests, and/or other demographic information.

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. In some embodiments, the resource is located in the social-network system 108 (e.g., in content 222) or on an external server, such as third-party server 110.

In some embodiments, connection information 220 includes information about the relationships between entities in the social network database 214. In some embodiments, connection information 220 includes information about edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, the social-network system 108 transmits a "friend request" to the second user. If the second user confirms the "friend request," the social-network system 108 creates and stores an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information about a particular action or activity performed by a user of the user node towards the other entity node. For example, a user may "like," provide other feedback about, or have "attended," "played," "listened," "cooked," "worked at," or "watched" the entity at the other node. The page in the social-networking service that corresponds to the entity at the other node may include, for example, a selectable "like," "check in," or "add to favorites" icon, or other affordances for providing input such as user feedback. After the user selects one of these icons or other affordances, the social-network system 108 may create an edge (e.g., a "like" edge, "check in" edge, or a "favorites" edge) in response to the corresponding user action. As another example, the user may listen to a particular song using a particular application (e.g., an online music application). In this case, the social-network system 108 may create a "listened" edge and a "used" edge between the user node that corresponds to the user and the entity nodes that correspond to the song and the application, respectively, to indicate that the user listened to the song and used the application. In addition, the social-network system 108 may create a "played" edge between the entity nodes that correspond to the song and the application to indicate that the particular song was played by the particular application.

In some embodiments, content 222 includes text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, content 222 includes executable code (e.g., games executable within a browser window or frame), podcasts, links, and the like.

In some embodiments, the social network server module 228 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Figure 3:
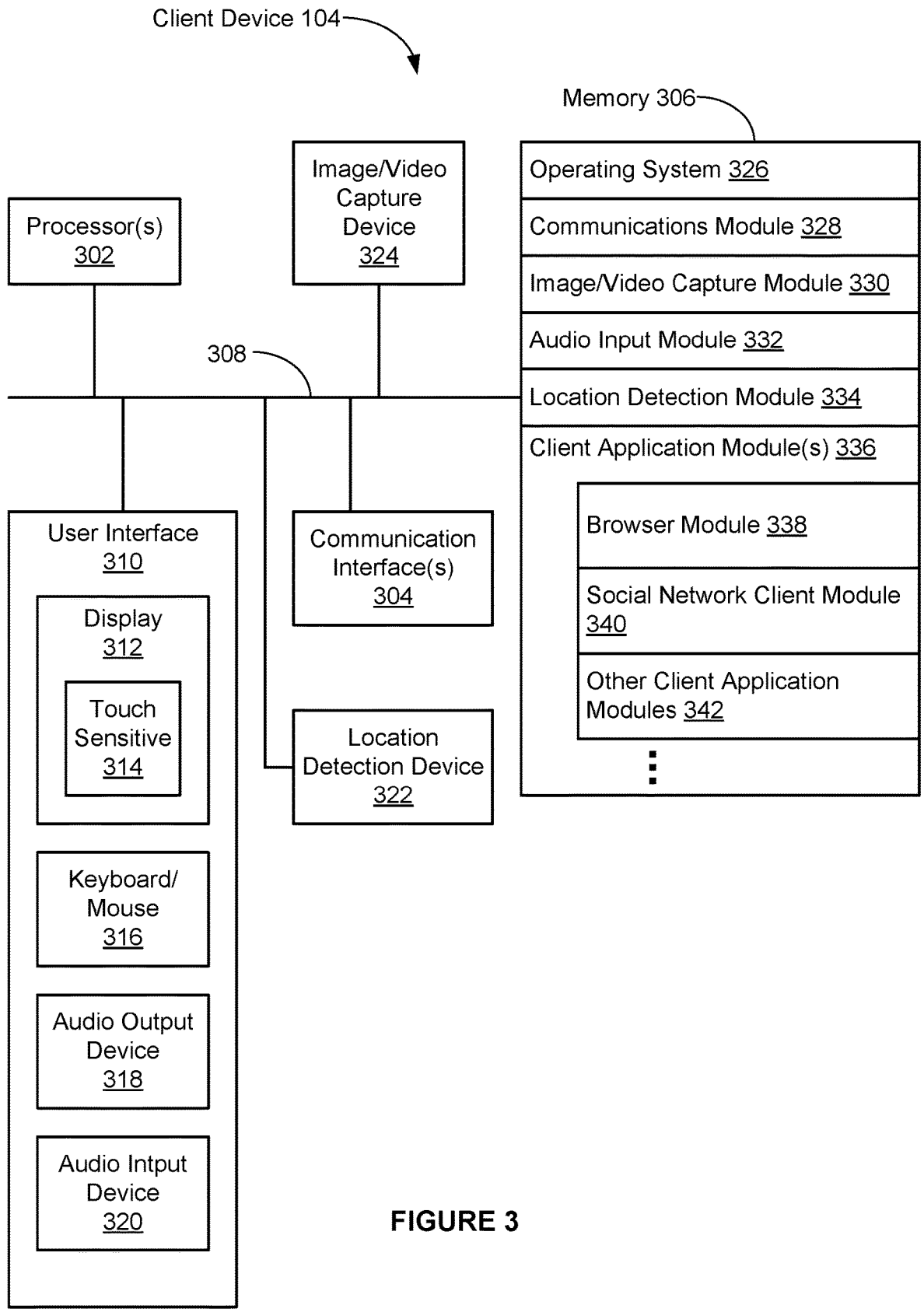
FIG. 3 is a block diagram illustrating an exemplary client device in accordance with some embodiments.

FIG. 3 is a block diagram illustrating an exemplary client device 104 in accordance with some embodiments. The client device 104 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device 104 includes inputs such as a keyboard, mouse, and/or other input buttons 316. Alternatively or in addition, in some embodiments, the display device 312 includes a touch-sensitive surface 314, in which case the display device 312 is a touch-sensitive display. In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GPS (global positioning satellite) or other geo-location receiver, for determining the location of the client device 104. The client device 104 also optionally includes an image/video capture device 324, such as a camera or webcam.

Memory 306 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

- an operating system 326 that includes procedures for handling various basic system services and for performing hardware dependent tasks;
- a network communication module 328 that is used for connecting the client device 104 to other computers via the one or more communication network interfaces 304 (wired or wireless) and one or more communication networks, such as the Internet, cellular telephone networks, mobile data networks, other wide area networks, local area networks, metropolitan area networks, and so on;
- an image/video capture module 330 (e.g., a camera module) for processing a respective image or video captured by the image/video capture device 324, where the respective image or video may be sent or streamed (e.g., by a client application module 336) to the social-network system 108;
- an audio input module 332 (e.g., a microphone module) for processing audio captured by the audio input device 320, where the respective audio may be sent or streamed (e.g., by a client application module 336) to the social-network system 108;
- a location detection module 334 (e.g., a GPS, Wi-Fi, or hybrid positioning module) for determining the location of the client device 104 (e.g., using the location detection device 322) and providing this location information for use in various applications (e.g., social network client module 340); and
- one or more client application modules 336, including the following modules (or sets of instructions), or a subset or superset thereof:
    - a web browser module 338 (e.g., Internet Explorer by Microsoft, Firefox by Mozilla, Safari by Apple, or Chrome by Google) for accessing, viewing, and interacting with web sites (e.g., a social-networking web site provided by the social-network system 108),
    - a social network module 340 for providing an interface to a social-networking service (e.g., a social-networking service provided by social-network system 108) and related features; and/or
    - other optional client application modules 342, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Attention is now directed towards embodiments of graphical user interfaces ("GUIs") and associated processes that may be implemented on a client device (e.g., the client device 104 in FIG. 3).

Figure 4B:
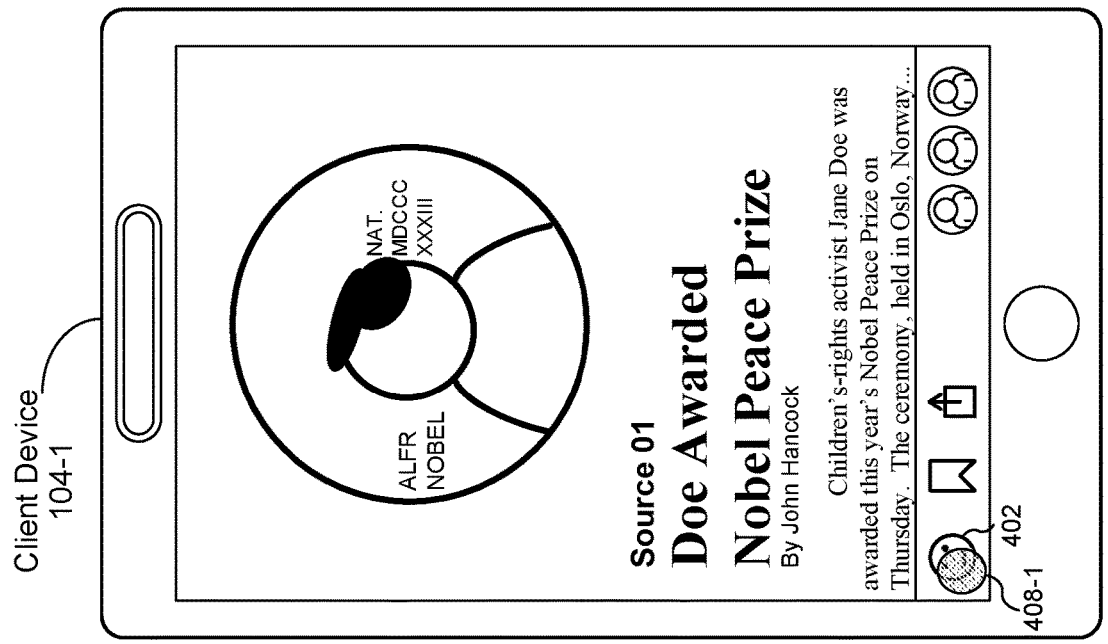
FIGS. 4A-4G illustrate exemplary graphical user interfaces on a client device for displaying and providing user feedback, in accordance with some embodiments.

FIGS. 4A-4G illustrate exemplary GUIs on a client device 104 for displaying and providing user feedback (e.g., emotion indicator corresponding to opinions), in accordance with some embodiments. Some GUIs in these figures are displayed in response to detected user inputs, starting from the displayed content item 400 (FIG. 4A), and are used to illustrate the processes described below, including the method 500 (FIGS. 5A-5B). The GUIs may be provided by a web browser (e.g., web browser module 338, FIG. 3), an application for a social-networking service (e.g., social network module 340), and/or a third-party application (e.g., client application module 342). While FIGS. 4A-4G illustrate examples of GUIs, in other embodiments, a GUI displays user-interface elements in arrangements distinct from the embodiments of FIGS. 4A-4G.

Figure 4A:
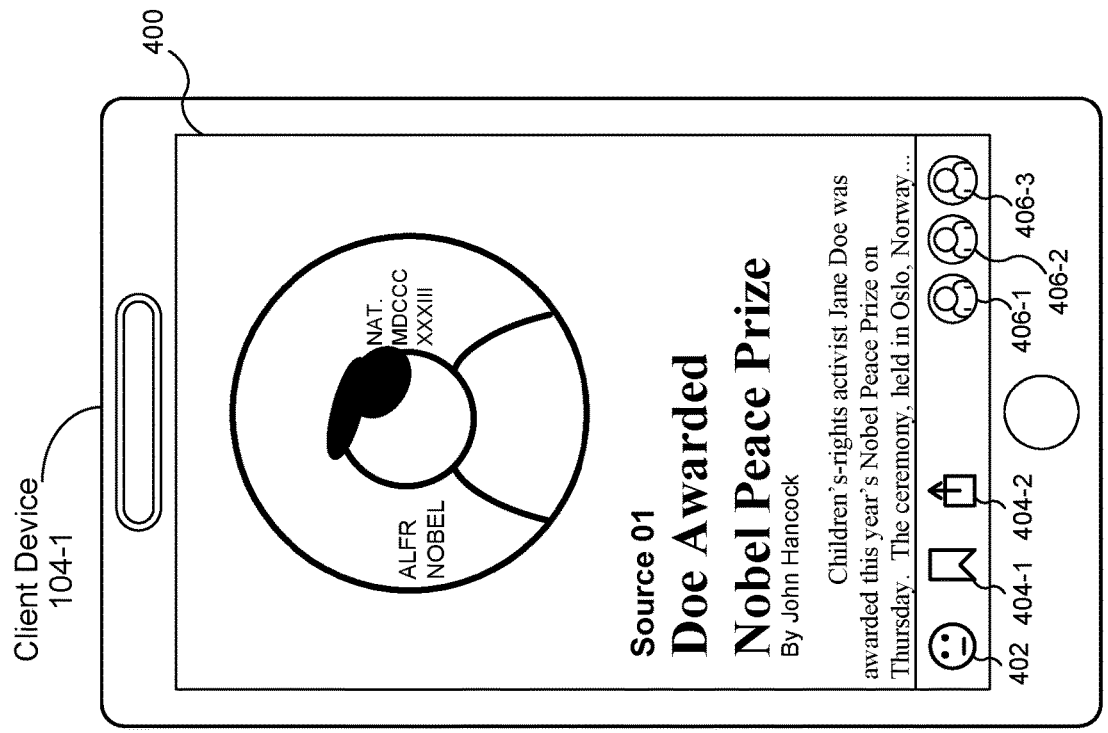
Figure 5A:
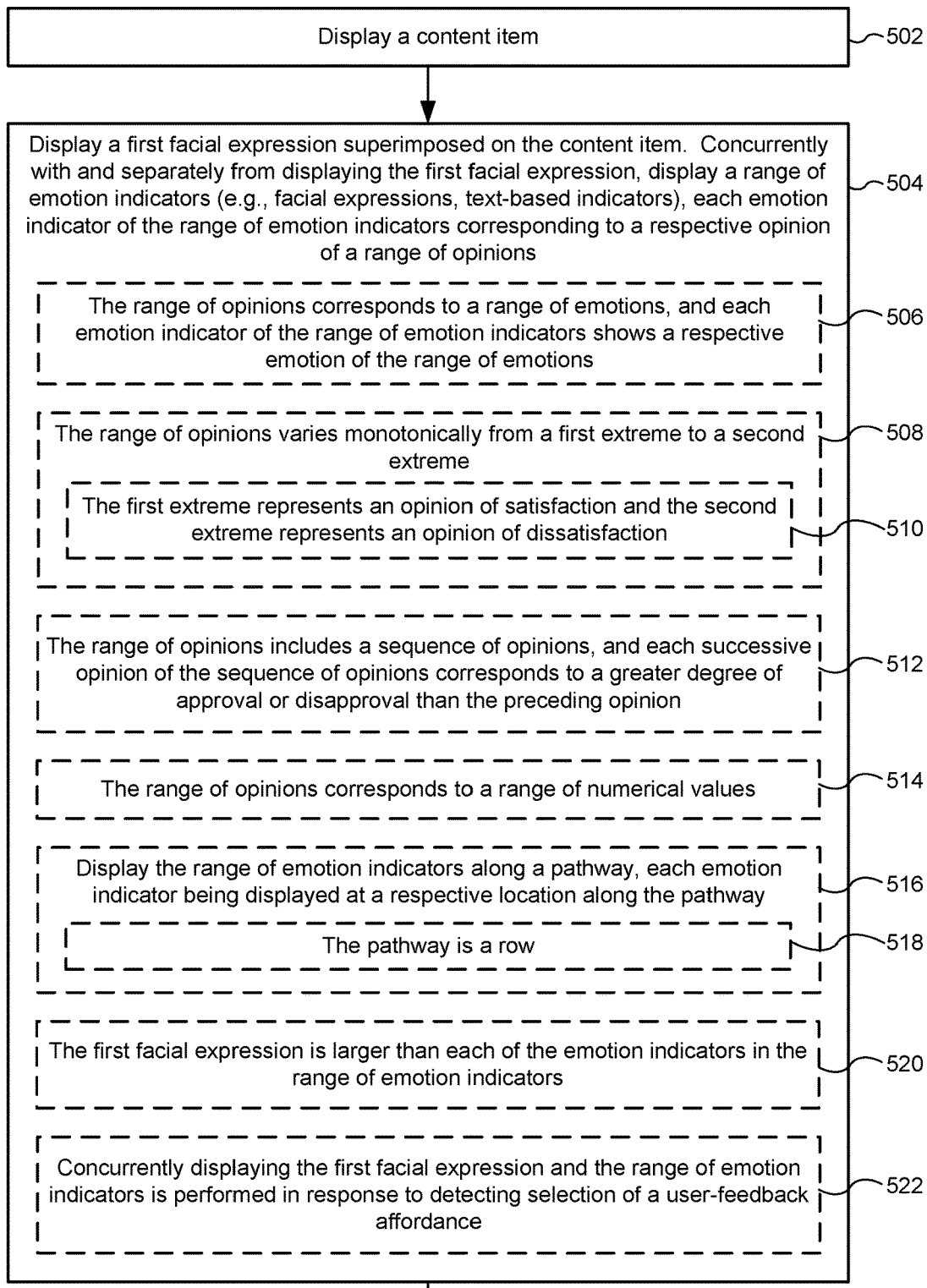
FIGS. 5A-5B are flow diagrams illustrating a method of displaying and providing user feedback, in accordance with some embodiments.
Figure 5B:
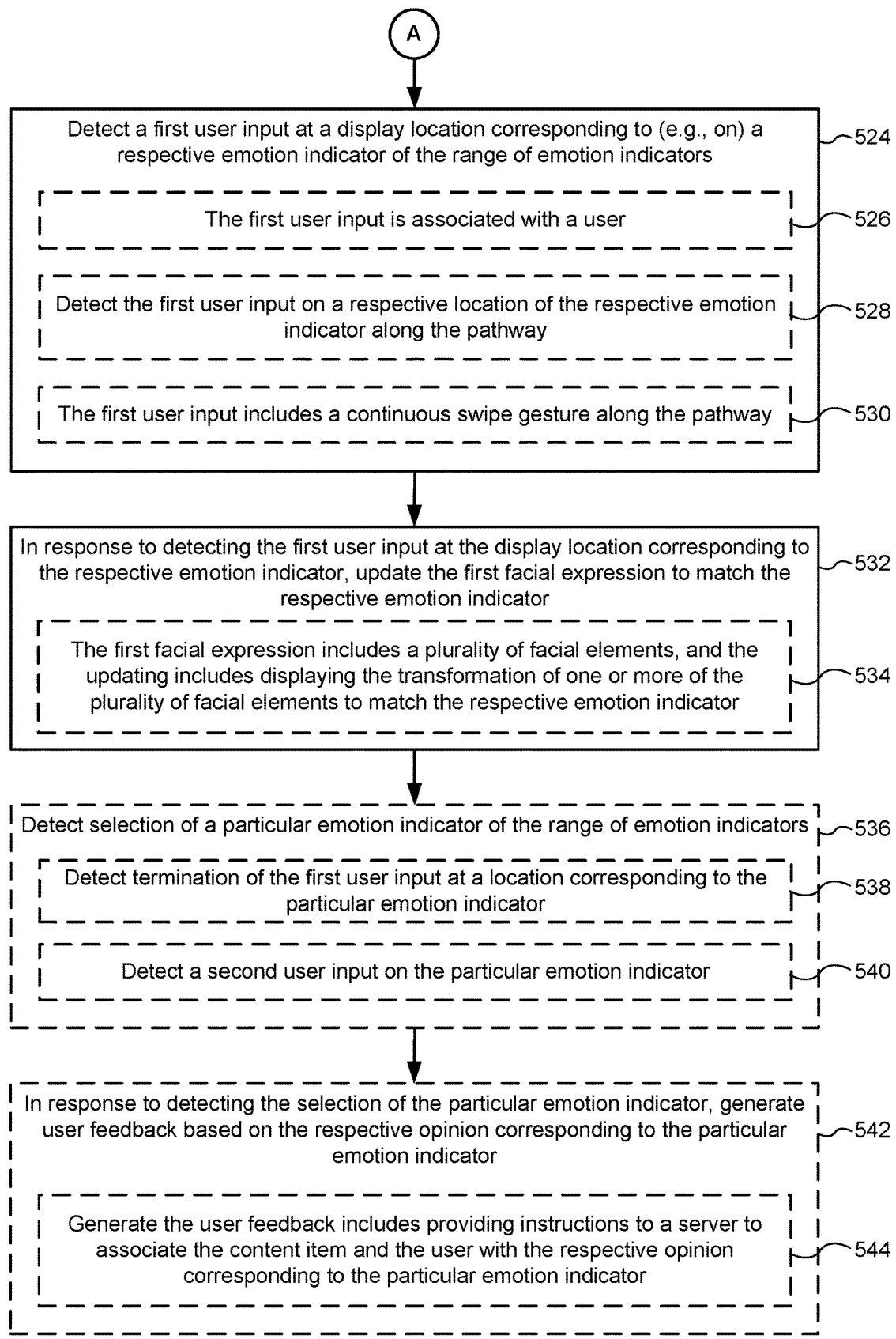

FIG. 4A illustrates a GUI for a content item 400 (e.g., a news article), various affordances (e.g., user-feedback affordance 402 and optional affordances 404), and feedback icons 406 corresponding to users who have provided feedback for the content item 400. In this example, the feedback icon 406-1 corresponds to a user associated with the client device 104-1 (e.g., user 102-1, FIG. 1).

Figures 1, 4C:
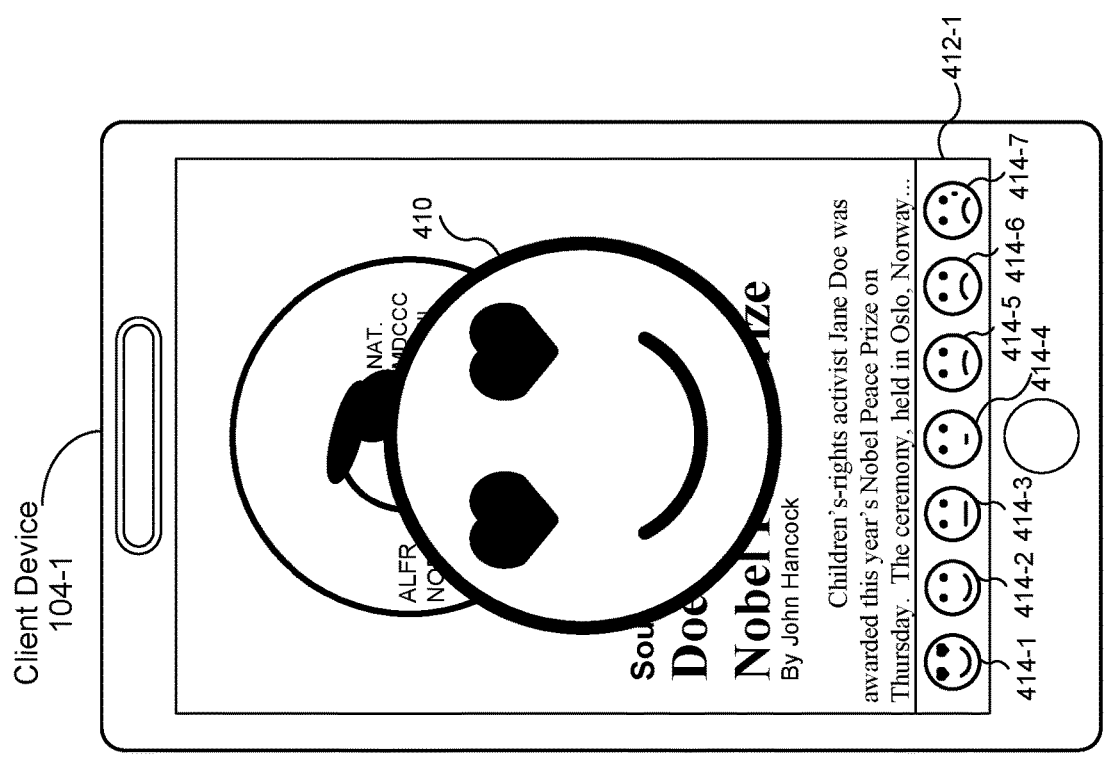
Figures 2, 4C:
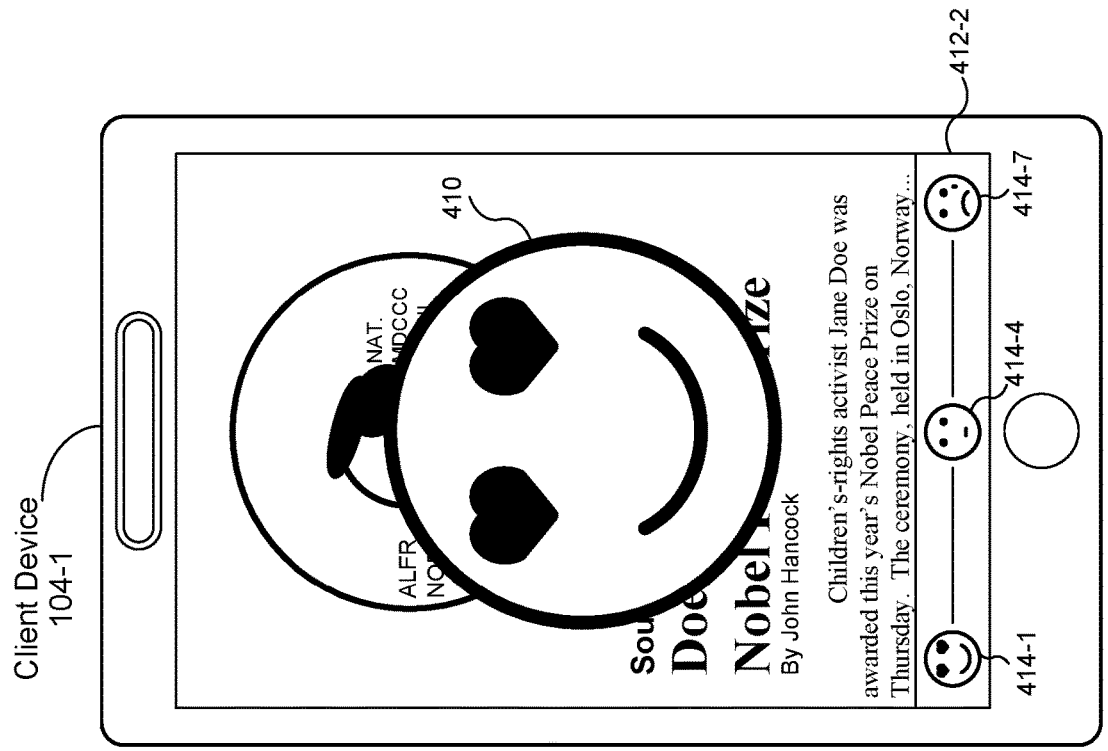
Figures 3, 4C:
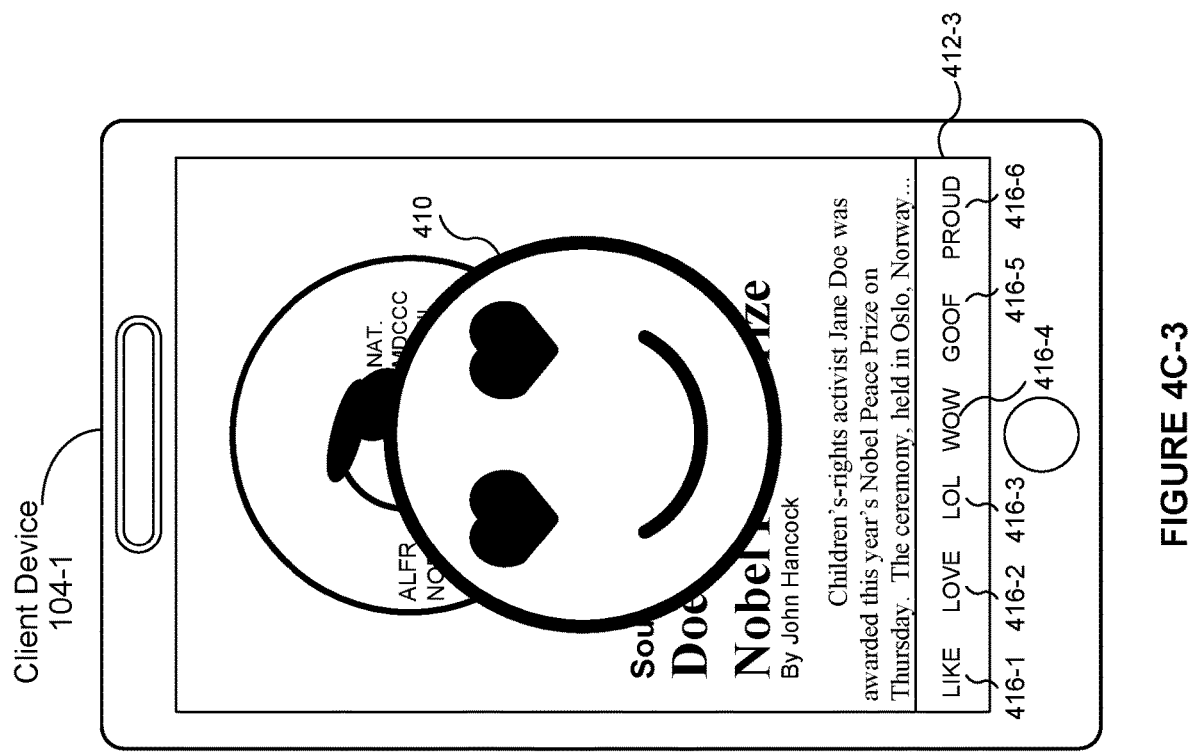

As shown in FIG. 4B, a touch gesture 408-1 (e.g., a tap) is detected on the user-feedback affordance 402. In response, a GUI selected from alternative GUIs shown in FIGS. 4C-1 through 4C-3 is displayed. The alternative GUIs display a superimposed facial expression 410 on the content item 400 and a range of emotion indicators 412. In some embodiments, a range of emotion indicators (e.g., 412-1 and 412-2, FIGS. 4C-1 and 4C-2) includes facial expressions 414 that correspond to opinions of the content item 400 that a user may provide as user feedback (e.g., a facial expression 414-1 or 414-2 corresponding to an opinion of happiness, approval, and/or satisfaction; and a facial expression 414-6 or 414-7 corresponding to an opinion of sadness, disapproval, and/or dissatisfaction). In some embodiments, a range of emotion indicators (e.g., 412-3, FIGS. 4C-3) includes text-based indicators 416 that correspond to opinions of the content item 400 that a user may provide as user feedback (e.g., a text-based indicator 416-1 ("LIKE") corresponding to an opinion of happiness, approval, and/or satisfaction).

Figure 4E:
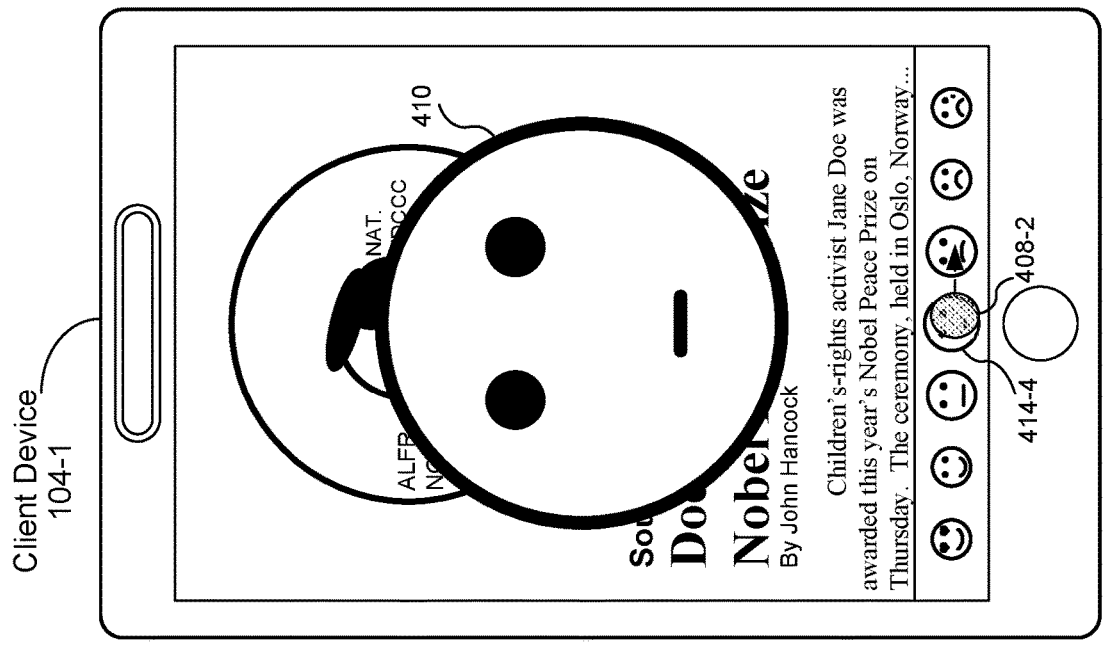
Figure 4D:
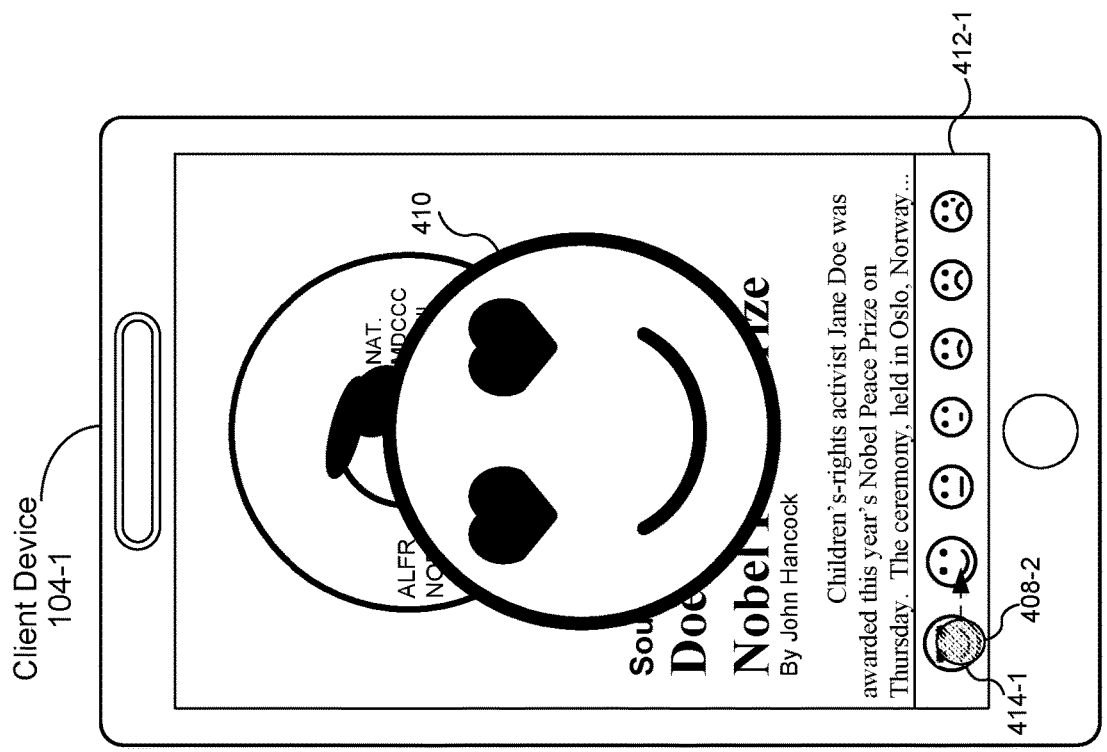

Referring to FIG. 4D, a touch gesture 408-2 (e.g., a swipe) is detected on (e.g., begins on) the first facial expression 414-1 of the range of facial expressions 412-1. In response, the superimposed facial expression 410 reflects the facial expression on which (or corresponding to the location at which) the touch gesture 408-2 is detected (e.g., facial expression 414-1, which is a facial animation with a smile and heart-shaped eyes). In FIG. 4E, as the touch gesture 408-2 continues to be detected along the range of facial expressions 412-1 (i.e., a user continues to make contact with the touch-sensitive surface of the client device 104-1), the superimposed facial expression 410 is updated and displays the facial expression on which (or corresponding to the location at which) the touch gesture 408-2 is detected (e.g., facial expression 414-4, which is a facial expression corresponding to an opinion of indifference (i.e., not happy/approving, not sad/disapproving)).

Figure 4G:
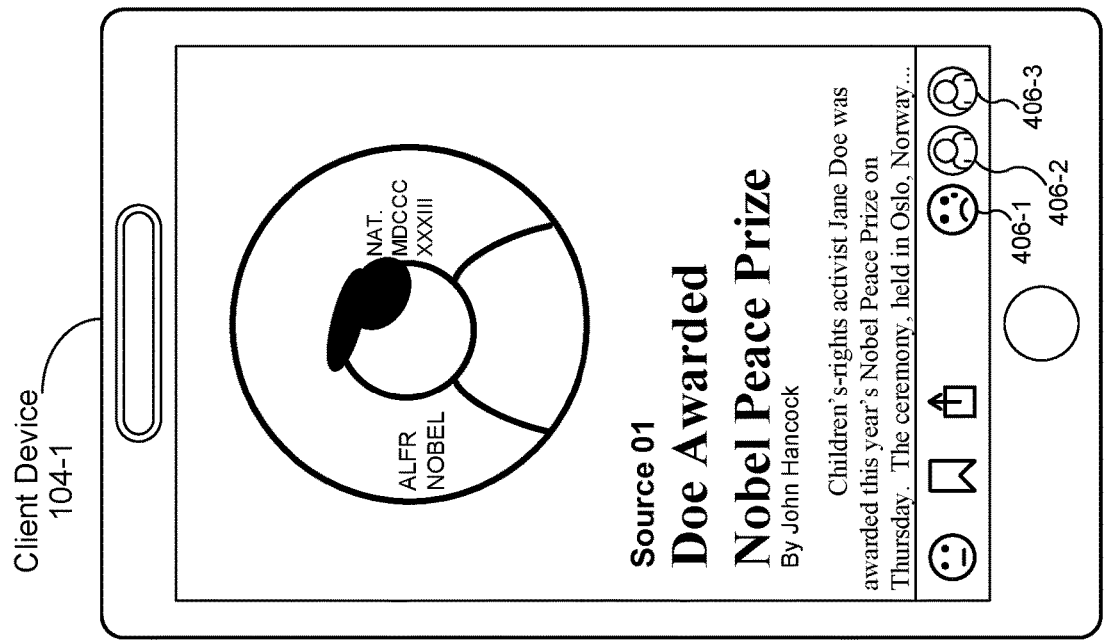
Figure 4F:
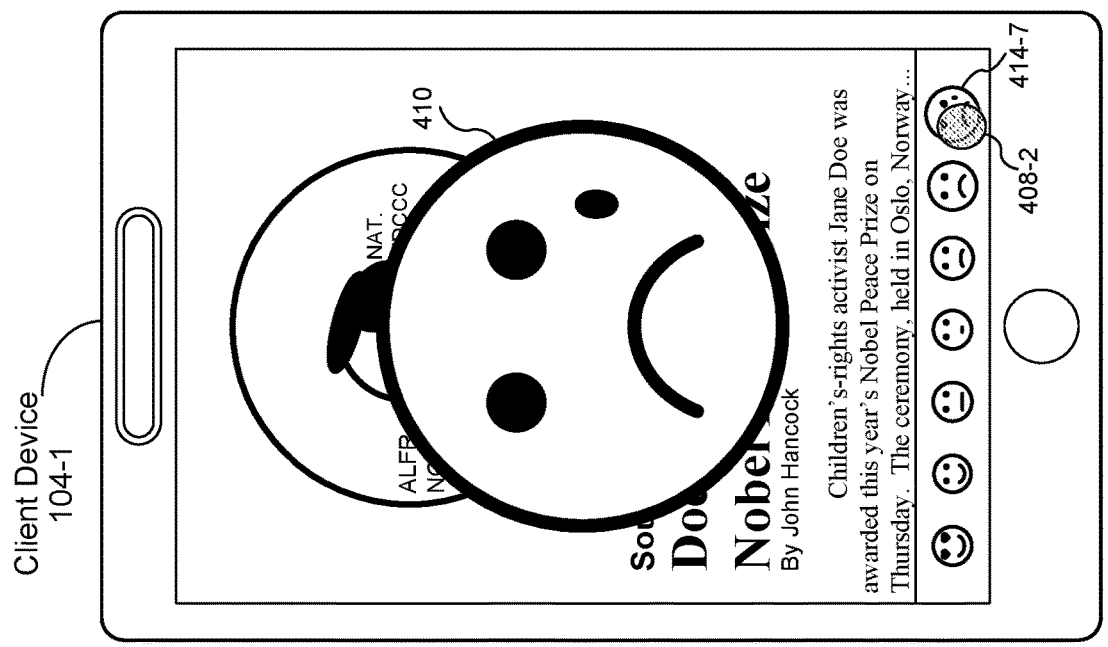

In FIG. 4F, a selection of a facial expression is detected when the touch gesture 408-2 terminates (e.g., user ceases contact with the touch-sensitive surface, or alternatively, maintains contact with a particular portion of the touch-sensitive surface for longer than a threshold duration of time) on (or at a location corresponding to) the facial expression 414-7. As a result, the superimposed facial expression 410 reflects the facial expression 414-7, and user feedback of the user for the content item is generated based on the respective opinion corresponding to the facial expression 414-7 (i.e., a user indicates his opinion with respect to the content item 400). In FIG. 4G, for example, feedback for the user 102-1 is shown by the feedback icon 406-1, which corresponds to an opinion of extreme sadness, disapproval, and/or dissatisfaction.

The GUIs shown in FIGS. 4A-4G are described in greater detail below in conjunction with the method 500 of FIGS. 5A-5B.

FIGS. 5A-5B are flow diagrams illustrating a method 500 of displaying and providing user feedback, in accordance with some embodiments. The method 500 is performed on an electronic device (e.g., client device 104, FIGS. 1 and 3). The method 500 corresponds to instructions stored in a computer memory (e.g., memory 306 of the client device 104, FIG. 3) or other computer-readable storage medium. To assist with describing the method 500, FIGS. 5A-5B will be described with reference to the exemplary GUIs illustrated in FIGS. 4A-4G.

In the method 500, the electronic device displays (502) a content item (e.g., content item 400 in FIG. 4A, such as a news article). The electronic device displays (504) a first facial expression superimposed on the content item. Concurrently with and separately from displaying the first facial expression, a range of emotion indicators (e.g., range 412-1 through 412-3, FIGS. 4C-1 to 4C-3) is displayed, each emotion indicator of the range of emotion indicators corresponding to a respective opinion of a range of opinions. In some embodiments, the emotion indicators are facial expressions (e.g., facial expressions 414 in FIGS. 4C-1 and 4C-2 corresponding to respective opinions (e.g., a "happy face")). In some embodiments, the emotion indicators are text-based indicators (e.g., text-based indicators 416 in FIG. 4C-3 such as words, phrases, acronyms, or any combination of text-based characters (e.g., "LOVE") corresponding to respective opinions). An opinion is a form of user feedback that reflects a user's reaction and sentiment towards a particular content item. As shown in FIG. 4C-1, a superimposed facial expression 410 is displayed as an overlay on top of the content item 400. Concurrently, a range of facial expressions 412-1 is displayed, which includes facial expressions 414-1 through 414-7 that correspond to particular opinions (e.g., facial expression 414-2 corresponds to a "happy face," indicating that the user holds a positive opinion with respect to the displayed content item 400). In contrast to a binary set of opinions (e.g., "like" or "do not like") or only a single opinion (e.g., "like"), a range of facial expressions allows users to more precisely convey their opinions and feedback with respect to a content item. This allows for more accurate user feedback in promoting content, as a user who would otherwise be misunderstood for "liking" the underlying content of a tragic news headline can instead promote the content with an appropriate facial expression and opinion (e.g., a sad facial expression representing a user's disapproval of the content, but desire to promote the content).

In some embodiments, the range of opinions corresponds (506) to a range of emotions, and each emotion indicator of the range of emotion indicators shows a respective emotion of the range of emotions. For example, the facial expression 414-2 corresponds to an emotion of happiness, illustrated by a smile, while facial expression 414-6 corresponds to an emotion of sadness, illustrated by a frown.

In some embodiments, the range of opinions varies (508) monotonically from a first extreme to a second extreme. In some embodiments, the first extreme represents (510) an opinion of satisfaction (e.g., strong satisfaction) and the second extreme represents an opinion of dissatisfaction (e.g., strong dissatisfaction). As shown in FIG. 4C-1, the range of opinions varies from a first extreme (e.g., facial expression 414-1, representing an opinion of extreme happiness and satisfaction) to a second extreme (e.g., facial expression 414-7, representing an opinion of extreme sadness and dissatisfaction). Opinions between the two extremes represent opinions of decreasing satisfaction or increasing dissatisfaction (with reference to the first extreme as a starting point). In some embodiments, the range of opinions includes (512) a sequence of opinions, and each successive opinion of the sequence of opinions corresponds to a greater degree of approval or disapproval (or, satisfaction or dissatisfaction) than the preceding opinion. For example, in FIG. 4C-1, facial expressions 414-6 and 414-7 both correspond to opinions of disapproval, but the facial expression 414-7 corresponds to a greater degree of disapproval than the facial expression 414-6, as illustrated by the addition of a teardrop. In some embodiments, the range is non-sequential and represents an unordered listing of opinions (i.e., random).

In some embodiments, the range of opinions corresponds (514) to a range of numerical values. For example, in FIG. 4C-1, the facial expressions 414-1 through 414-7 each correspond to a distinct numerical value (e.g., each of the facial expressions 414 correspond to a number on a scale from 1 to 7).

In some embodiments, the range of emotion indicators is (516) displayed along a pathway, each emotion indicator being displayed at a respective location along the pathway. FIG. 4C-2 illustrates a pathway on which the facial expression 414-1, 414-4, and 414-7 are positioned, where additional facial expressions—although not shown—have corresponding locations along the pathway (e.g., in FIG. 4C-2, a user input detected on the pathway connecting the facial expression 414-1 and 414-4 corresponds to one of facial expressions 414-2 or 414-3, shown in FIG. 4C-1). In some embodiments, the pathway is (518) a row (e.g., pathway as shown in FIGS. 4C-1 and 4C-2). In other embodiments, the pathway may take the form of other shapes (e.g., a square, a circle, an arbitrarily defined continuous pathway, etc.).

In some embodiments, the first facial expression is (520) larger than each of the emotion indicators in the range of emotion indicators (e.g., superimposed facial expression 410 is larger in display size than each of the facial expressions 414).

In some embodiments, concurrently displaying the first facial expression and the range of emotion indicators is (522) performed in response to detecting selection of a user-feedback affordance. For example, the touch gesture 408-1 (e.g., a tap) detected on the user-feedback affordance 402 in FIG. 4B results in concurrently displaying the superimposed facial expression 410 and the facial expressions 414 in FIG. 4C-1 or 4C-2.

A first user input is (524) detected at a display location corresponding to (e.g., on) a respective emotion indicator of the range of emotion indicators. In some embodiments, the respective emotion indicator of the range of emotion indicators is a respective facial expression. For example, as shown in FIG. 4D, the touch gesture 408-2 is detected on the facial expression 414-1 of the range of facial expressions 412-1. In some embodiments, the first user input is (526) associated with a user (e.g., user 102-1 who is associated with the client device 104-1, FIGS. 1 and 4A). In some embodiments, the respective emotion indicator of the range of emotion indicators is a respective text-based indicator (e.g., a touch gesture is detected on a text-based indicator 416 of the range of text-based indicators 412-3 in FIG. 4C-3, not shown). In some embodiments, the first user input is (528) detected on a respective location of the respective emotion indicator along the pathway (e.g., in FIG. 4D, the touch gesture 408-2 is detected on a location of a pathway that corresponds to the facial expression 414-1). In some embodiments, the first user input includes (530) a continuous swipe gesture along the pathway. For example, the touch gesture 408-2 begins in FIG. 4D, and continues to be detected throughout FIG. 4E until its termination is detected in FIG. 4F (e.g., when the user ceases contact with the touch-sensitive surface).

In some embodiments, detecting selection of the user-feedback affordance (detected at 522) includes detecting a third user input. The third user input and the first user input (detected at 524) compose a continuous contact that begins with the third user input. For example, the third user input is a tap-and-hold selection (e.g., touch gesture 408-1, FIG. 4B) of the user-feedback affordance 402, and the first user input is a continuous swipe gesture (e.g., touch gesture 408-2, FIG. 4C) that is executed after maintaining sustained contact with the touch-sensitive surface from the third user input (i.e., tap-and-hold, then swipe).

In response to detecting the first user input at the display location corresponding to the respective emotion indicator, the first facial expression updates (532) to match the respective emotion indicator. For example, in FIG. 4E, the superimposed facial expression 410 is updated to correspond to the facial expression 414-4, since the touch gesture 408-2 is detected on the facial expression 414-4. Another example is shown in FIG. 4F. In some embodiments, the first facial expression includes (534) a plurality of facial elements, and the updating includes displaying the transformation of one or more of the plurality of facial elements to match the respective emotion indicator. For example, referring to FIGS. 4D through 4F, as the touch gesture 408-2 continues to be detected at varying locations along the pathway (along which the facial expressions 414 are positioned), the eyes and mouth of the superimposed facial expression 410 transform accordingly. For instance, as the touch gesture 408-2 transitions from the facial expression 414-1 (FIG. 4D) to 414-7 (FIG. 4F), the eyes transition from heart-shaped to dotted, and the mouth transitions from an upward curvature (i.e., a smile) to a downward curvature (i.e., a frown). Optionally, facial elements are added or removed (e.g., adding tears).

In some embodiments, the electronic device detects (536) selection of a particular emotion indicator of the range of emotion indicators. For example, detecting the selection includes (538) detecting termination of the first user input at a location corresponding to (e.g., on) the particular emotion indicator. Termination of the user input may include a user ceasing contact with the touch-sensitive surface of the client device 104-1 (e.g., user lifts finger), a user maintaining contact with a particular portion of the touch-sensitive surface for a length of time that satisfies a threshold duration of time (e.g., user touch idling for longer than, or at least, a predefined period), or a user discontinuing movement of a touch gesture (e.g., the user swipe gesture, while still maintaining contact, stops and does not traverse any additional distance). An example is shown in FIG. 4F, where the touch gesture 408-2 terminates (e.g., discontinues further movement along the pathway) and the facial expression 414-7 is selected. In some embodiments, detecting the selection includes detecting (540) a second user input on the particular emotion indicator. The second user input may be distinct from the first user input (detected at 524), such as a tap gesture for selecting a particular facial expression.

In response to detecting the selection of the particular emotion indicator, user feedback is (542) generated based on the respective opinion corresponding to the particular emotion indicator. For example, in response to detecting the selection of the facial expression 414-7 (FIG. 4F), user feedback of the user 102-1 (associated with the client device 104-1) for the content item 400 is generated based on the opinion corresponding to the selected facial expression (e.g., an opinion of extreme sadness, disapproval, and/or dissatisfaction). As shown in FIG. 4G, the feedback of the user associated with the client device 104-1 is shown by the feedback icon 406-1, which reflects the facial expression 414-7. In some embodiments, generating the user feedback includes (544) providing instructions to a server to associate the content item and the user with the respective opinion corresponding to the particular emotion indicator (e.g., referring to FIGS. 2 and 4G, instructions are sent to the social network system 108 to associate the opinion corresponding to the facial expression 414-7 with the user 102-1 and the content item 400). In some embodiments, the numerical value (514) of an opinion corresponding to the selected facial expression is provided to a server, and is associated with the user and the content item.

For situations in which the systems discussed above collect information about users, the users may be provided with an opportunity to opt in/out of programs or features that may collect personal information (e.g., information about a user's preferences or a user's contributions to social content providers). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method performed by a client device having a touch-sensitive display, comprising:
    displaying (i) a plurality of affordances in a first area of the touch-sensitive display and (ii) a content item in a second area of the touch-sensitive display, wherein the plurality of affordances includes a user-feedback affordance for providing feedback about the content item;
    detecting a first user input at the user-feedback affordance;
    in response to detecting the first user input:
        displaying a first facial expression superimposed on the content item; and
        concurrently with and separately from displaying the first facial expression, replacing display of the plurality of affordances with a range of facial expressions in the first area, each facial expression of the range of facial expressions corresponding to a respective opinion of a range of opinions;
    detecting a second user input at a location of a second facial expression in the displayed range of facial expressions, wherein the second facial expression is different from the first facial expression; and
    in response to detecting the second user input, updating the first facial expression with the second facial expression superimposed on the content item.

2. The method of claim 1, further comprising detecting termination of the second user input at the second facial expression.

3. The method of claim 2, wherein detecting termination of the second user input at the second facial expression comprises ceasing to detect the second user input.

4. The method of claim 2, wherein detecting termination of the second user input at the second facial expression comprises detecting that the second user input maintains contact with a particular portion of the touch-sensitive display for a length of time that satisfies a threshold duration of time.

5. The method of claim 2, further comprising:
    in response to detecting termination of the second user input, generating user feedback based on the respective opinion corresponding to the second facial expression.

6. The method of claim 5, wherein:
    the second user input is associated with a user, and
    generating the user feedback comprises providing instructions to a server to associate the content item and the user with the respective opinion corresponding to the second facial expression.

7. The method of claim 1, wherein displaying the range of facial expressions in the first area comprises displaying the range of facial expressions along a pathway, each facial expression being displayed at a respective location along the pathway.

8. The method of claim 7, wherein detecting the second user input comprises detecting the second user input on a respective location along the pathway.

9. The method of claim 7, wherein the second user input comprises a continuous swipe gesture along the pathway.

10. The method of claim 1, wherein:
the range of opinions corresponds to a range of emotions; and
each facial expression of the range of facial expressions shows a respective emotion of the range of emotions.

11. The method of claim 1, wherein:
the first facial expression comprises a plurality of facial elements, and
displaying the second facial expression comprises updating the first facial expression by changing one or more of the plurality of facial elements to match facial elements of the second facial expression.

12. The method of claim 1, wherein the range of opinions varies monotonically from a first extreme to a second extreme.

13. The method of claim 12, wherein the range of facial expressions includes at least three facial expressions corresponding to respective opinions of the range of opinions that vary monotonically from the first extreme to the second extreme.

14. The method of claim 12, wherein the first extreme represents an opinion of satisfaction and the second extreme represents an opinion of dissatisfaction.

15. The method of claim 12, wherein:
the range of opinions comprises a sequence of opinions, and
each successive opinion of the sequence of opinions corresponds to a greater degree of approval or disapproval than the preceding opinion.

16. The method of claim 1, wherein the first and second user inputs comprise a continuous contact that begins with the first user input.

17. The method of claim 1, wherein displaying the second facial expression is performed while the second user input remains in contact with the touch-sensitive display.

18. The method of claim 1, further comprising:
detecting a third user input at a third facial expression, different from the first and second facial expressions, of the range of facial expressions.

19. A client device, comprising:
a touch-sensitive display;
one or more processors; and
memory storing one or more programs for execution by the one or more processors, the one or more programs including instructions for:
displaying (i) a plurality of affordances in a first area of the touch-sensitive display and (ii) a content item in a second area of the touch-sensitive display, wherein the plurality of affordances includes a user-feedback affordance for providing feedback for the content item;
detecting a first user input at the user-feedback affordance;
in response to detecting the first user input:
displaying a first facial expression superimposed on the content item; and
concurrently with and separately from displaying the first facial expression, replacing display of the plurality of affordances with a range of facial expressions in the first area, each facial expression of the range of facial expressions corresponding to a respective opinion of a range of opinions;
detecting a second user input at a second facial expression of the range of facial expressions; and
in response to detecting the second user input, updating the first facial expression with the second facial expression, different from the first facial expression, superimposed on the content item.

20. A non-transitory computer-readable storage medium storing one or more programs for execution by one or more processors of a client device having a touch-sensitive display, the one or more programs including instructions for:
displaying (i) a plurality of affordances in a first area of the touch-sensitive display and (ii) a content item in a second area of the touch-sensitive display, wherein the plurality of affordances includes a user-feedback affordance for providing feedback for the content item;
detecting a first user input at the user-feedback affordance;
in response to detecting the first user input:
displaying a first facial expression superimposed on the content item; and
concurrently with and separately from displaying the first facial expression, replacing display of the plurality of affordances with a range of facial expressions in the first area, each facial expression of the range of facial expressions corresponding to a respective opinion of a range of opinions;
detecting a second user input at a second facial expression of the range of facial expressions; and
in response to detecting the second user input, updating the first facial expression with the second facial expression, different from the first facial expression, superimposed on the content item.

* * * * *